US005567200A

United States Patent [19]
Swartzendruber

[11] Patent Number: 5,567,200
[45] Date of Patent: Oct. 22, 1996

[54] METHOD AND APPARATUS FOR CIRCULATING AIR

[75] Inventor: Ray E. Swartzendruber, Syracuse, Ind.

[73] Assignee: CTB Inc., Milford, Mich.

[21] Appl. No.: 160,397

[22] Filed: Dec. 1, 1993

[51] Int. Cl.⁶ .................................................. F24F 7/06
[52] U.S. Cl. ........................................ 454/338; 454/257
[58] Field of Search ........................... 415/223; 454/338, 454/257

[56] References Cited

U.S. PATENT DOCUMENTS

| | | | |
|---|---|---|---|
| 1,604,448 | 10/1926 | Hosch | 415/223 |
| 1,642,205 | 9/1927 | Hosch | 415/223 |
| 2,650,021 | 8/1953 | Morrill | 415/223 |
| 4,353,680 | 10/1982 | Hiraoka et al. | 415/223 |

FOREIGN PATENT DOCUMENTS 1230640  9/1960  France ................................. 415/223

OTHER PUBLICATIONS

Brochure entitled "36 " and 48 " Grower Fans," Aerotech, Inc., Jan., 1993.
Brochure entitled "Controlled Environment Systems for Farm Buildings—Type NBF Fans," American Coolair Corporation, Mar., 1992.
Brochure entitled "Controlled Environment Systems for Farm Buildings: Farm Building Ventilation—Type NCF Fans," American Coolair Corporation, Nov., 1992.
Brochure entitled "Assembly Instructions and Parts Manual: Vertical Belt–Drive Fans—Models 3C145 through 3C151A," Dayton Electric Manufacturing Co. (undated).
Brochure entitled "Create Profits Through Proper Ventilation," Hired–Hand Inc. (undated).

Primary Examiner—John T. Kwon
Attorney, Agent, or Firm—Harness, Dickey & Pierce, P.L.C.

[57] ABSTRACT

A method and apparatus for circulating air. The apparatus includes a motor for rotating the blades of a fan. The apparatus also includes a housing for the fan having a wall which is disposed proximate to the blades in the fan in a spaced relationship thereto. In addition, the apparatus includes a motor mount which is operable to support the wall of the housing so as to substantially maintain the spaced relationship between the wall and the blades of the fan.

49 Claims, 6 Drawing Sheets

METHOD AND APPARATUS FOR CIRCULATING AIR

BACKGROUND OF THE INVENTION

1. Field of the Invention

This invention relates to air circulation devices, and more particularly, to a method and apparatus for circulating air.

2. Description of the Related Art

In various industries such as those involving agriculture and manufacturing, it is often necessary to circulate relatively large amounts of air through a building. In such circumstances, a fan is often installed in the wall of the building to assist in the circulation of air. Such fans typically have a housing which extends at least partially through the wall of the building as well as a plurality of blades which rotate within the housing.

The housing of such a fan generally has an annular wall which is disposed adjacent to the end portions of the blades of the fan. The annular wall serves to define the flow path for air circulating through the housing. As will be appreciated by those skilled in the art, it is desirable to have the distance between the end portions of the fan blades and the annular wall of the housing be as small as possible so as to improve the efficiency of the fan. However, to minimize this distance, it is often necessary that the annular wall be relatively rigid so as not to deform and contact the blades during operation of the fan. This typically requires that the material forming the housing be relatively rigid. In addition, the hub assembly to which the blades are secured has to be carefully positioned within the housing to ensure that the blades do not contact the annular wall of the housing during movement. This generally requires that the mounting member, which is used to support the hub assembly and the motor, be carefully oriented in the housing. Since the mounting member typically includes a number of brackets which are secured to the housing by fasteners, it is often necessary to precisely position the brackets and fasteners to ensure that the blades of the fan are centered within the housing.

In addition to the foregoing, some fans which are used to circulate air through buildings use a belt drive mechanism. In such circumstances, the fan includes a rotating shaft which is attached to both the fan hub assembly as well as to a first pulley. The first pulley in turn is connected to a second pulley by means of a V-belt. Because the second pulley is driven by a motor, the V-belt causes the first pulley to rotate which in turn causes the blades of the fan to rotate.

While this particular type of fan design is effective, there are nevertheless certain disadvantages associated with this design. For example, relatively expensive pillow block bearings (or similar) have to be used to permit rotation of the shaft which is used to drive the fan hub assembly. In addition, the bearings, the first pulley, as well as the hub assembly often tend to rust and become secured to the shaft. It therefore becomes difficult to disassemble the hub assembly as well as the first pulley from the shaft to service these particular components. In addition, the first pulley is typically formed by machining a casting which tends to make the first pulley more expensive than pulleys which are formed by other procedures such as by sheet metal stampings.

SUMMARY OF THE INVENTION

In one embodiment, the present invention relates to an apparatus for circulating air having a fan. The apparatus includes a motor for driving the blades of the fan, as well as a housing for receiving the motor and the fan blades. The housing includes an annular wall which is disposed proximate to the end portions of the fan blades in a space relationship thereto. The apparatus further includes means for mounting the motor to the housing which is operable to substantially maintain the space relationship between the wall and the end portions of the fan blades.

In another embodiment, the present invention also relates to a method for assembling an apparatus for circulating air. The method includes the steps of forming a housing having an internal contour defining a surface feature. The method further includes the step of forming a motor mount which is operable to be fixedly secured to the housing by engagement with the surface feature of the housing. The method also includes the step of securing the motor to the motor mount and then engaging the motor mount with the surface feature so as to fixedly secure the motor mount to the housing.

According, it is a general object of the present invention to provide a method and apparatus for circulating air using a fan in which the space between the blades of the fan and the housing is minimized. A related object of the present invention is to provide a method and apparatus for circulating air using a fan in which the mounting for the motor used to drive the fan is operable to maintain a spaced relationship between the housing and the blades of the fan.

A further object of the present invention is to provide a method and apparatus for circulating air using a fan in which the efficiency of the fan is relatively high.

An additional object of the present invention is to provide a method and apparatus for circulating air in which the motor and associated motor mount may be secured to the housing with relative ease.

A further object of the present invention is to provide a method and apparatus for circulating air using a fan in which a motor mount used for supporting a motor is able to distribute the load of the motor relatively uniformly along a relatively large region of the housing.

An additional object of the present invention is to provide a method and apparatus for circulating air using a fan in which the motor mount used for supporting a motor is able to limit distortion of the fan housing during operation of the fan.

A further object of the present invention is to provide a method and apparatus for circulating air using a fan in which the hub assembly, upon which the blades of the fan are secured, rotates around a stationary shaft.

A further object of the present invention is to provide a method and apparatus for circulating air using a fan in which the strength of the fan housing can be reduced.

Another object of the present invention is to provide a method and apparatus for circulating air using a fan which is relatively simple and low in cost.

BRIEF DESCRIPTION OF THE DRAWINGS

These features of the present invention which are believed to be novel are set forth with particularity in the appended claims. The organization and manner of operation of the invention, together with the further objects and advantages thereof, may best be understood by reference to the following description taken in conjunction with the accompanying drawings, in which identical reference numerals identify similar elements, and in which:

FIG. 3 is an exploded perspective view of the apparatus for circulating air shown in FIG. 2 according to the teachings of one preferred embodiment of the present invention;

DESCRIPTION OF THE PREFERRED EMBODIMENTS

The following discussion of the preferred embodiments of the present invention is merely exemplary in nature. Accordingly, this discussion in no way is intended to limit the scope of the invention, the application of the invention or the use of the invention.

Figure 1:
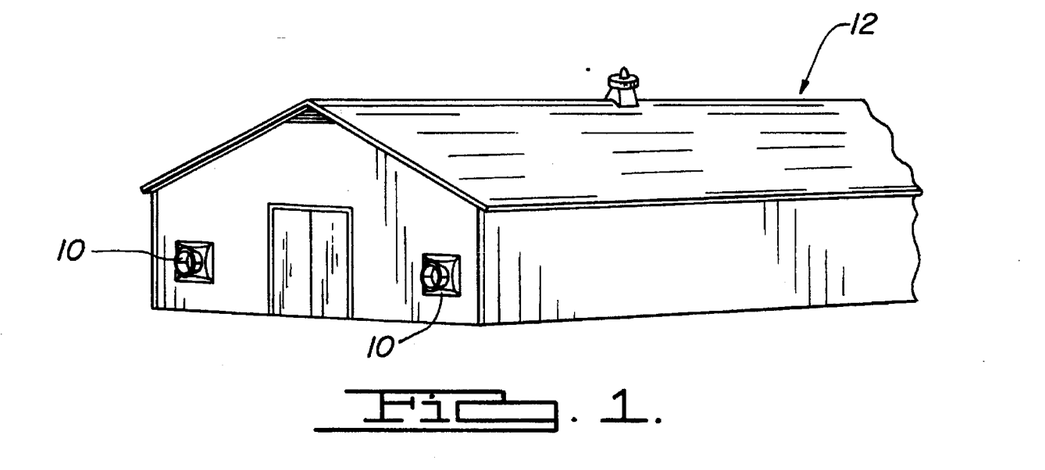
FIG. 1 is an elevational view of a building having an apparatus for circulating air according to the teachings of the preferred embodiments of the present invention.

Referring to FIG. 1, an apparatus 10 for circulating air is shown. The apparatus 10 is depicted as being in operative association with a building 12 which may be used for various purposes. The building 12 includes a venting device (not shown) which, together with the apparatus 10, allows air entering the building 12 to circulate through the building 12 and then to be exhaust into the environment. As will be appreciated by those skilled in the art, the building 12 may be of any type of structure in which the air circulation is important. In this regard, the building 12 may be used for agricultural operations, such as for raising livestock, though the building 12 could also be used for various industrial, manufacturing, residential, office, or other similar purposes.

Figure 2:
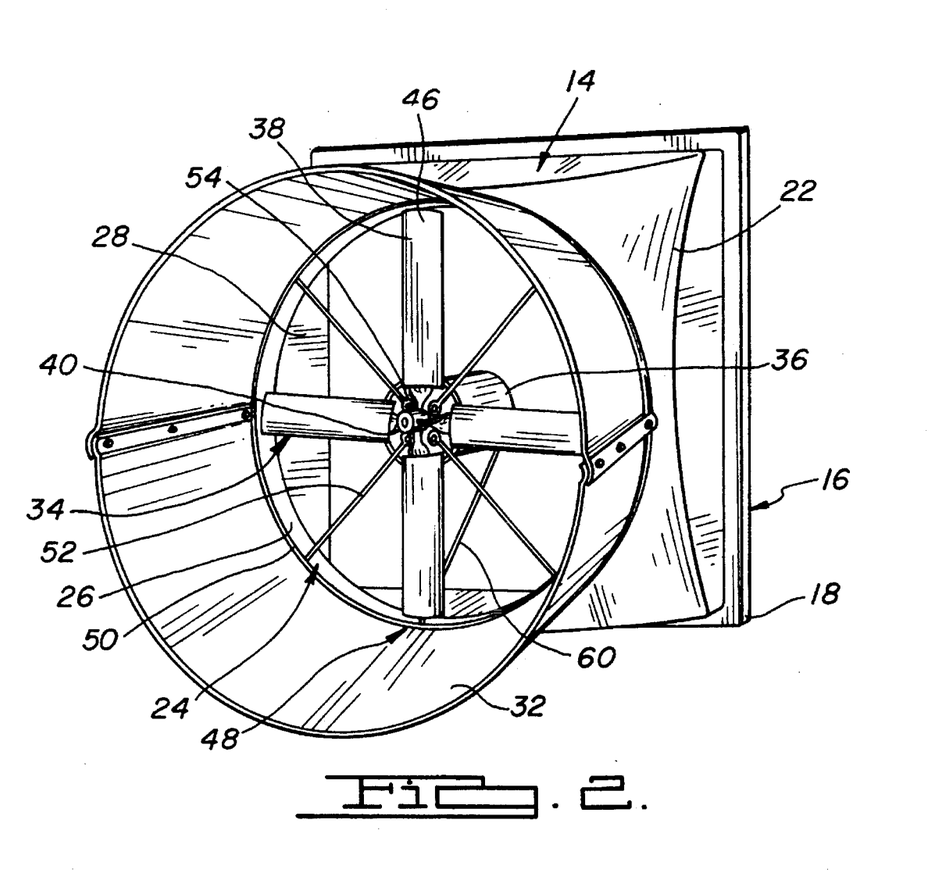
FIG. 2 is a perspective view of the apparatus for circulating air shown in FIG. 1 according to the teachings of one preferred embodiment of the present invention.
Figure 4:
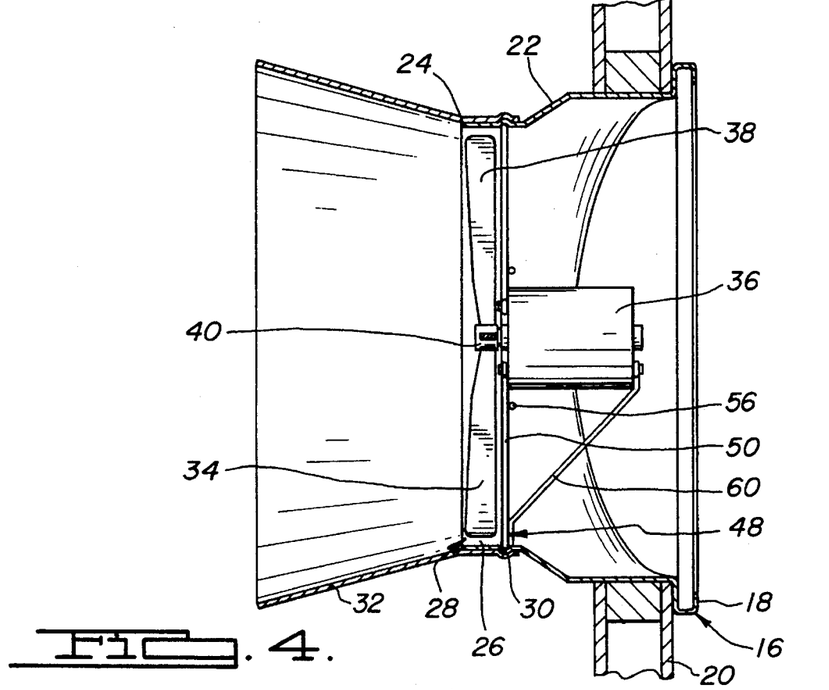
FIG. 4 is a cross-sectional view of the apparatus for circulating air shown in FIG. 2 illustrated as being installed in a building.

The apparatus 10 will now be more particularly described with reference to FIGS. 2–4. The apparatus 10 includes a housing 14 which forms a flow path for air flowing through the apparatus 10. The housing 14 has a first end portion 16 which includes a generally rectangular flange 18. The flange 18 is operable to be mounted on the interior of the wall 20 of the building 12 in a manner similar to that shown in FIG. 4. The remainder of the housing 14 extends through the wall 20 to the exterior of the building 12. The housing 14 further includes a generally conically shaped central portion 22 which serves to channel the flow of air between the interior of the building 12 and a second end portion 24 of the housing 14. The second end portion 24 of the housing 14 includes an annular wall 26 which defines an opening 28 in the housing 14 and has a surface feature such as an annular groove 30.

As will be more fully described below, the annular groove 30 is used to receive and position a motor mount within the housing 14.

The housing 14 may be made from any suitable material. Preferably, the housing 14 is rotomolded from a polymeric material such as polyethylene. However, it will be understood that any other suitable materials may be used including ABS, polypropylene, vinyls, nylons, and so forth. In addition, the thickness of the material forming the housing 14 may be relatively thin. In this regard, the thickness of the housing 14 may be approximately 0.125 inches when the diameter of the annular wall 26 is approximately 24 inches.

The housing 14 further includes a generally conically shaped hood 32 which mechanically communicates with the annular wall 26 of the housing 14. The hood 32 serves as a static regain cone which is used to improve the efficiency of the apparatus 10. The hood 32 may be rotomolded from a polymeric material such as polyethylene. However, other suitable materials may be used including ABS, polypropylene, vinyls, nylons and so forth may also be used. Furthermore, it will be appreciated that the hood 32 may be of different shapes. For example, the hood 32 may be a blow-out hood in which the hood covers the opening 28 of the housing 14 when no air is flowing through the housing 14, and then swings open when air is driven through the housing 14. In such a case, the mountings for such a blow-out hood can be integrally formed in the housing 14. As will be appreciated by those skilled in the art, the purpose of such a blow-out hood is to prevent air from flowing into the building 12 through the apparatus 10 when the fan which is described below is not operating.

The apparatus 10 further includes a fan 34 as well as a motor 36 which is operable to drive the fan 34. The fan 34 includes a plurality of integrally formed blades 38 which are connected to the centrally located hub assembly 40. The hub assembly 40 includes an aperture 42 which is operable to receive the shaft 44 of the motor 36. Upon rotation of the shaft 44 of the motor 36, the fan 34 rotates so as to cause the blades 38 to drive air through the housing 14. Each of the blades 38 of the fan 34 includes an end portion 46 which is located in a spaced relationship with respect to the annular wall 26 of the housing 14 as will be more fully described below. In this regard, the end portions 46 of the blades 38 are within about 0.375 inches from the annular wall 30.

To provide means for mounting the motor 36 to the housing 14, the apparatus 10 further comprises the motor mount 48. The motor mount 48 is operable to substantially maintain the spaced relationship between the annular wall 26 of the housing 14 and the end portions 46 of the blades 38 of the fan 34. This spaced relationship is maintained because movement of the annular wall 26 during operation of the fan 34 is restricted by the motor mount 48. The motor mount 48 comprises a generally first circular member 50 and a plurality of radial support members 52. The first circular member 50 is generally circular in cross-section and is operable to be disposed within the annular groove 30 of the housing 14. The radial support members 52 are preferably secured at approximately 90° intervals around the periphery of the first circular member 50 by a suitable means such as by welding. It will be understood, however, that the radial support members 52 may be secured at any suitable location around the periphery of the first circular member 50 so as to provide support for the motor 36. The radial support members 52 extend from the first circular member 50 radially inward and each terminate with circular mounting end portions 54.

Disposed proximate to the circular mounting end portions 54 is a second circular member 56. The second circular member 56 is secured to the radial support members 52 by suitable means such as by welding and serve to maintain a generally planar relationship between the radial support members 52 during operation of the apparatus 10. As those skilled in the art will appreciate, the second circular member 56 may be of any other suitable shape which is able to generally maintain a planar relationship between the radial support members 52.

The motor 36 may be secured to the motor mount 48 in the following manner. The front of the motor 36 is secured to the radial support members 52 by means of a plurality of bolts 58 which extend through the circular mounting end portions 54 and into the housing of the motor 36. In addition, the rear of the motor 36 is supported by means of a rear mounting bracket 60 which extends from the rear of the motor 36 toward the first circular member 50 and is secured to the first circular member 50 by a suitable means such as by welding. It will be understood, however, that the rear mounting bracket 60 may be eliminated when it is not necessary to adequately support the motor 36 within the housing 14.

When the motor 36 and fan 34 have been attached to the motor mount 48, the motor mount 48 is inserted into the housing 14 in such a manner that the first circular member 50 engages the annular groove 30 of the housing 14. It will be appreciated, however, that the motor mount 48 can also be inserted first into the housing 14 and then the motor 36 attached to the motor mount 48.

Because the first circular member 50 engages the annular groove 30 substantially along the entire length of the annular groove 30, the load associated with the motor 36 and the fan 34 which is transmitted by the motor mount 48 to the housing 14 is uniformly distributed along the annular groove 30. Accordingly, the stress appearing at the regions on the housing 14 which support the motor mount 48 are less concentrated. In addition, the first circular member 50 tends to increase the rigidity of the annular wall 26 of the housing 14 and therefore tends to prevent distortion of the annular wall 26 during operation of the motor 36. Accordingly, the annular wall 26 does not therefore have to be made from as thick a material to ensure that the annular wall 26 is sufficiently rigid to prevent deformation during rotation of the fan 34. In addition, the spacing between the end portions 46 of the blades 38 of the fan 34 and the annular wall 26 can be reduced which tends to increase the efficiency of the fan 34. Finally, the fan 34 can be easily centered within the housing 14 by simply inserting the motor mount 48 into the annular groove 30. This avoids the necessity of adjusting the position of various other types of brackets and fasteners which may otherwise be required to centrally position the fan 34 within the housing 14.

The method for assembling the apparatus 10 according to the present invention will now be described. The housing 14 is first formed from a polymeric material by a suitable technique such as rotomolding. In this regard, the housing 14 is formed so as to define a generally annular wall 26 which is proximate to the end portions 46 of the blades 38. In addition, the housing 14 is formed so that the housing 14 has an internal surface contour which defines a surface feature such as the annular groove 30. It will be appreciated, however, that other types of surface features, such as a raised channel contour, may also be used.

The motor mount 48 is then formed by initially forming the substantially first circular member 50 and then forming the plurality of radial support members 52. The radial support members 52 are then secured to the first circular member 50 by a suitable means such as by welding. The motor 36 is then secured to the motor mount 48 by means of the bolts 58 which extend through the circular mounting end portions 54 of the radial support members 52. The motor mount 48 is then inserted into the housing 14 so as to cause the motor mount 48 to engage the annular groove 30. It will be appreciated, however, that the motor mount 48 may also be initially secured to the housing 14, after which the motor 36 is secured to the motor mount 48.

Figure 5:
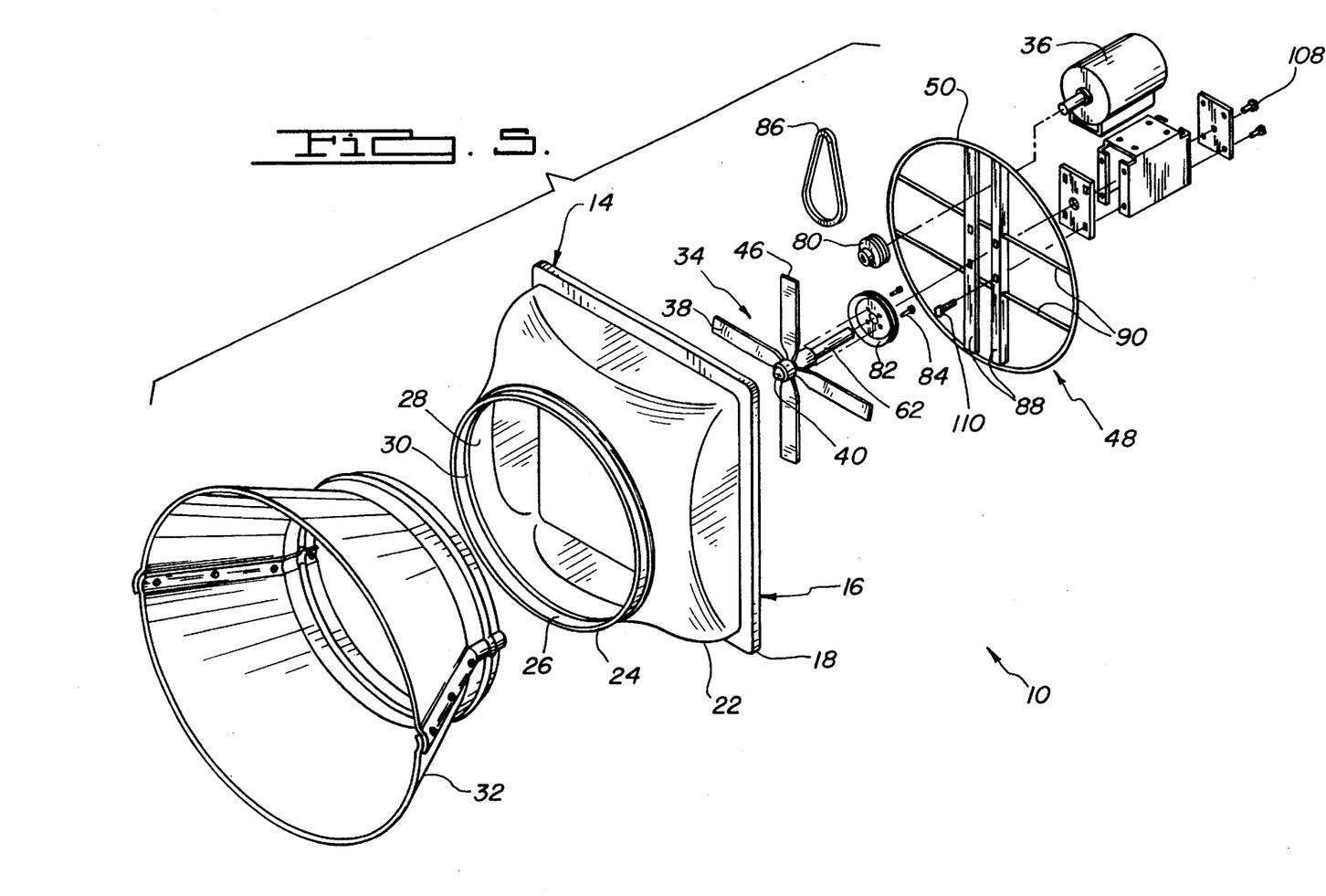
FIG. 5 is an exploded perspective view of an apparatus for circulating air according to the teachings of the second preferred embodiment of the present invention.
Figure 6:
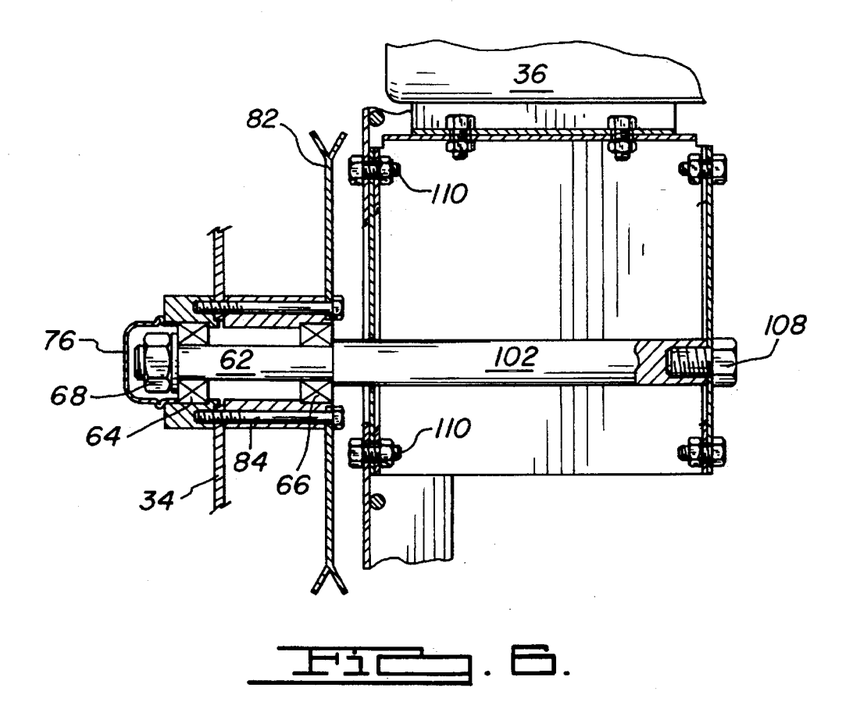
FIG. 6 is a cross-sectional view of the apparatus for circulating air shown in FIG. 5 according to the teachings of the second preferred embodiment of the present invention.

The second preferred embodiment of the present invention will now be described with reference to FIGS. 5 and 6. In this regard, like numerals will be used to reference similar elements which have been described in conjunction with the first preferred embodiment of the present invention. The housing 14 according to the second preferred embodiment of the present invention includes a first end portion 16 having a flange 18 which is used to mount the housing 14 on the interior of the wall 20 of the building 12. In addition, the housing 14 further includes a generally conical shaped central portion 22 which serves to channel the flow of air from the first end portion 16 of the housing 14 to a second end portion 24 of the housing 14. The second end portion 24 includes an annular wall 26 which defines an opening 28 in the housing 14 and includes a surface feature such as an annular groove 30. The annular groove 30 is used to receive and position a motor mount 48 of the shape described below. The housing 14 further includes a hood 32 which mechanically communicates with the annular wall 26 and serves to increase the efficiency of the apparatus 10.

To provide means for directing air through the housing, the apparatus 10 includes a fan 34 which is driven by a motor 36. The fan 34 includes a plurality of blades 38 which are connected to a centrally located hub assembly 40. The hub assembly 40 includes an aperture 42 which is operable to receive a fixed shaft 62 about which the fan 34 rotates. Disposed between the hub assembly 40 and the fixed shaft 62 is a first bearing 64 and a second bearing 66. The first and second bearings 64 and 66 serve to permit the fan 34 to rotate with respect to the fixed shaft 62 while the fixed shaft 62 remains stationary. Movement of the hub assembly 40 is limited in one direction with respect to the fixed shaft 62 by a nut 68 which is located adjacent to the first bearing 64. In addition, movement of the hub assembly 40 is further limited in another direction with respect to the fixed shaft 62 by a shoulder 70 which is located on the fixed shaft 62 adjacent the second bearing 66. It will be appreciated that the shoulder 70 may be replaced by a clip or a collar which is located on the fixed shaft 62 which would serve to limit movement of the hub assembly 40. Other suitable means for limiting movement of the hub assembly 40 may also be used.

The hub assembly 40 further includes a lubricant flow passage 72 and a zirk fitting 74. The lubricant flow passage 72 extends from the zirk fitting 74 to a position between the first and second bearings 64 and 66. Accordingly, the first and second bearings 64 and 66 may be lubricated by injecting lubricant into the zirk fitting 74 which flows through the lubricant flow passage 72 to the first and second bearings 64 and 66.

To restrict the flow of the lubricant to an area proximate to the first and second bearings 64 and 66, the hub assembly 40 further includes an end cap 76 as well as a seal 78. The end cap 76 is disposed adjacent to the nut 68 and prevents water and dust from entering the hub assembly 40, as well as prevents the lubricant from flowing out of the hub assembly 40 from the first bearing 64. In addition, the seal 78 acts as a pressure relief to allow lubricant to flow past the seal 78 if the pressure of the lubricant within the hub assembly 40 becomes excessive. The seal 78 also serves to prevent water and dust from entering the hub assembly 40. It will be appreciated that the hub assembly 40 may have other provisions for lubricating the first and second bearings 64 and 66. For example, the end cap 76 may also have a zirk fitting.

The hub assembly 40 includes a pulley hub subassembly 79 as well as a fan hub subassembly 81. The pulley hub subassembly 79 is disposed on the fixed shaft 62 adjacent to the second bearing 66 and is operable to engage a pulley which is more fully described below. The fan hub subassembly 81 is disposed on the fixed shaft 62 adjacent to the first bearing 62 as well as to the pulley hub subassembly 79. The fan hub subassembly 81 is used to engage and rotate the fan 34 during operation of the apparatus 10. The fan hub subassembly 81 is secured to the pulley hub subassembly 79 by means of a plurality of bolts which extend through the pulley in the manner described below. Because the hub assembly 40 comprises a separate pulley hub subassembly 79 as well as a separate fan hub subassembly 81, the pulley and the fan 34 can be readily interchanged so that the hub assembly 40 can be used with a variety of pulleys and fans of different sizes.

To allow the motor 36 to drive the fan 34, the apparatus 10 further includes a first pulley 80 and a second pulley 82. The first pulley 80 is securely mounted to the drive shaft of the motor 36, while the second pulley 82 is secured to the hub assembly 40 by means of a plurality of screws 84. The screws 84 extend into both the pulley hub subassembly 79 and the fan hub subassembly 81 and therefore are operable to secure the subassemblies 79 and 81 together. A V-belt 86 is used to mechanically connect the first pulley 80 with the second pulley 82. Accordingly, the rotation of the drive shaft of the motor 36 causes the first pulley 80 to rotate which in turn causes the second pulley 82 to rotate by means of the V-belt 86. The rotation of the second pulley 82 in turn causes the blades 38 of the fan 34 to rotate which causes air to be driven through the housing 14.

To provide means for mounting the motor 36 to the housing 14, the apparatus 10 further includes the motor mount 48. The motor mount 48 is operable to substantially maintain a spaced relationship between the annular wall 26 of the housing 14 and the end portions 46 of the blades 38 of the fan 34 during operation of the fan 34. The motor mount 48 includes a circular member 50 as well as a first plurality of support members 88 and a second plurality of support members 90. The first plurality of support members 88 span the circular member 50 in a first direction and generally extend parallel to each other in a spaced relationship. In a similar fashion, the second plurality of support members 90 span the circular member 50 in a second direction and extend generally parallel to each other in a spaced relationship. It will be appreciated by those skilled in the art that the number of support members 88 and 90 will depend on the particular application. For example, it is possible that a single support member 90 may be used with the motor mount 48 or that a single support member 90 may be used. In addition, while the first plurality of support members 88 may be L-shaped and the second plurality of support members 90 may be circular in cross-section, other suitable shapes may be used.

Disposed centrally with respect to the first and second plurality of support members 88 and 90 is a plate 92. The plate 92 has a central aperture 93 for receiving the fixed shaft 62, as well as a plurality of spaced apertures 94 which permit a motor platform and a shaft platform to be mounted thereto as will be more fully described below. The plate 92 is attached to the first plurality of support members 88 by a suitable means such as by a plurality of bolts which extend through the plate 92 and the support members 88.

To provide means for securing the motor 36 and the fixed shaft 62 to the motor mount 48, the apparatus 10 also includes a motor platform 96 as well as a shaft platform 98. The shaft platform 98 is generally planar in construction and has a central aperture 102 and a plurality of laterally displaced apertures 106. The aperture 102 is used to receive the fixed shaft 62 which is secured thereto by means of a bolt 108. The shaft platform 98 is secured to the motor platform 96 by means of a plurality of bolts 110 (only one of which is shown) which pass through the apertures 106 in the shaft platform 98. The motor platform 96 is generally rectangular in shape and includes a generally planar member 112 upon which the motor 36 is secured as well as the flange portions 114. Each of the flange portions 114 includes an aperture 116 which is operable to receive a bolt 110 which passes through one of the apertures 94 in the plate 92.

It will be appreciated that the motor mount 48 functions in a manner similar to that shown in conjunction with the first embodiment of the present invention. That is, the motor 36 and the fan 34 are attached to the motor mount 48 and then the motor mount 48 is placed within the annular groove 30 of the housing 14. Alternatively, the motor mount 48 may be placed within the annular groove 30 of the housing 14, and then the motor 36 and the fan 34 are attached to the motor mount 48. Accordingly, the load which is transmitted by the motor mount 48 to the housing 14 is uniformly distributed along the annular groove 30 because the circular member 50 engages the annular groove 30 substantially along its entire length. Furthermore, the circular member 50 tends to increase the rigidity at the annular wall 26 of the housing 14 and therefore the annular wall 26 does not have to be made from as thick a material to maintain a spaced relationship between the end portions 46 of the blades 38 of the fan 34 and the annular wall 26. In addition, the spacing between the end portions 46 of the blades 38 and the annular wall 26 can be reduced because there is less deformation of the annular wall 26 to so as to increase the efficiency of the fan 34. In addition, the fan 34 can be easily centered within the housing 14 during assembly of the apparatus 10.

The use of the fixed shaft 62 which is stationary and having the hub assembly 40 rotate around the fixed shaft 62 is also advantageous. For example, the use of the fixed shaft 62 allows relatively low cost bearings (e.g. Timken Roller Bearing No. 5) to be used instead of rather expensive pillow bearings. In addition, the second pulley 82 can be made from sheet metal and either stamped or spun rather than machined from a casting and therefore the cost of the second pulley 82 can be reduced. In addition, there are few components which tend to rust together which creates problems during servicing. Finally, there is only one seal (i.e., the seal 78) which is required when using the fixed shaft 62 rather than a larger number of seals (typically four seals are used) which are required with standard rotary shafts and pillow block bearings. The use of a single seal reduces the possibility that the apparatus will fail due to seal wear. There is also no need for trantorque type bushing or tapered Browning type bushings which may be required with standard rotary shafts. As will be appreciated by those skilled in the art, the use of such a fixed shaft 62 may be used with other types of housings and motor mounts in addition to those described herein.

Figure 7:
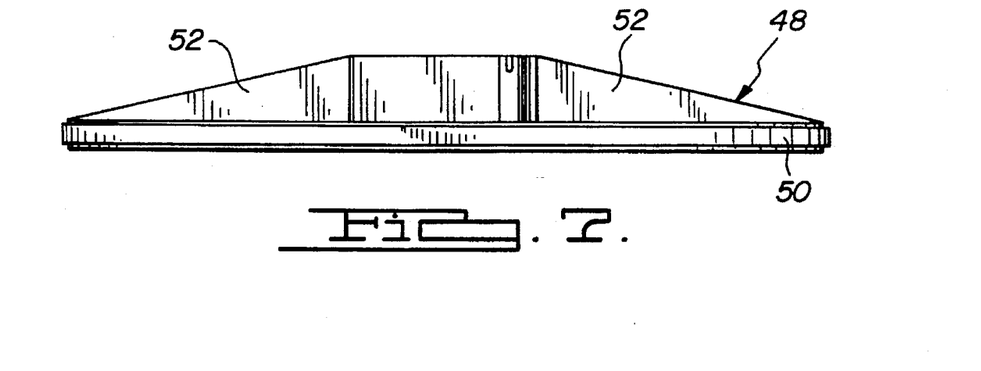
FIG. 7 is a side elevational view of a motor mounting for a fan according to the teachings of the third preferred embodiment of the present invention.
Figure 8:
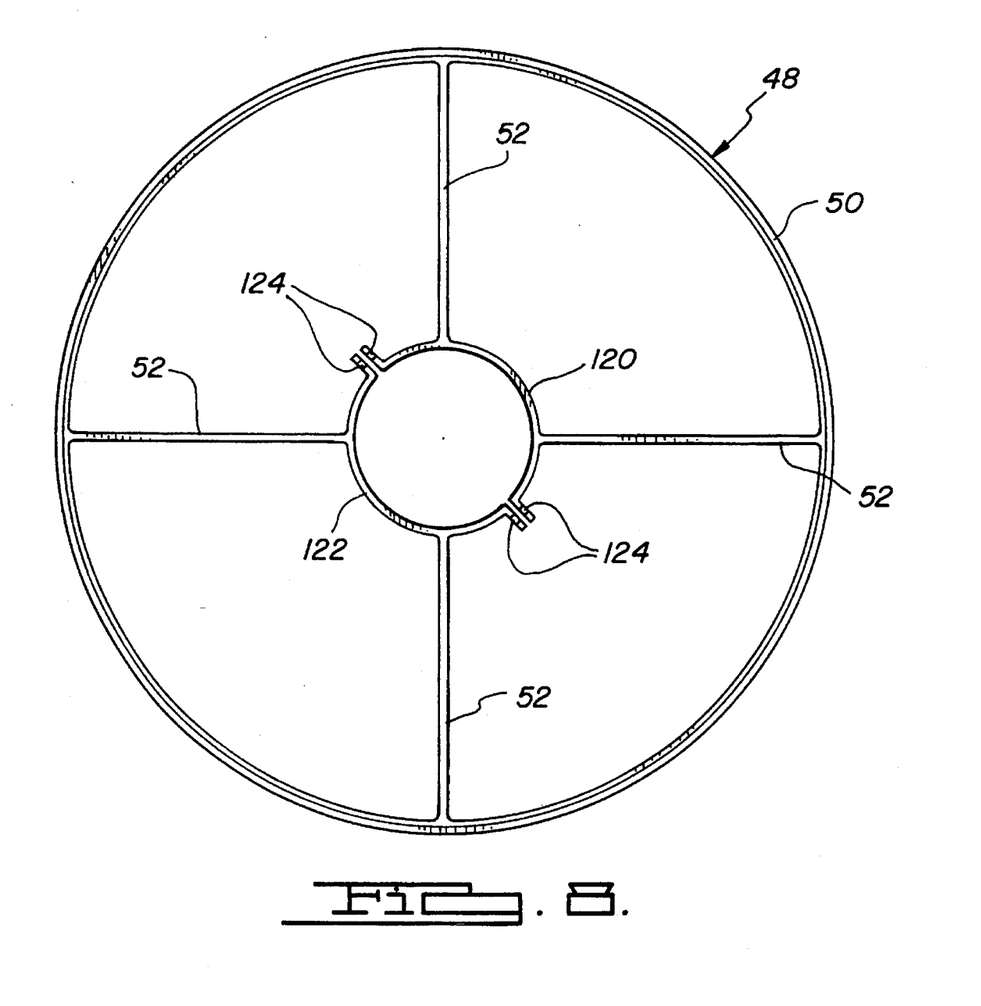
FIG. 8 is a front elevational view of the motor mounting for a fan shown in FIG. 7 according to the teachings of the third preferred embodiment of the present invention.
Figure 9:
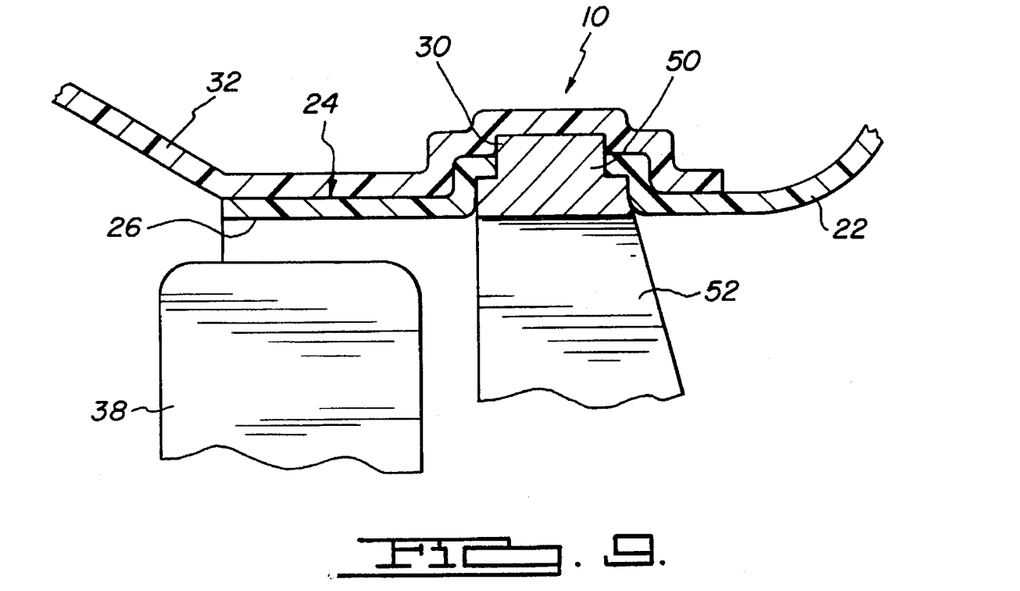
FIG. 9 is a partial cross-sectional view of the motor mounting for a fan shown in FIG. 7 as being attached to the housing according to the teachings of the third preferred embodiment of the present invention.

Another preferred embodiment of the present invention is shown in FIGS. 7–9. In this regard, like reference numerals are used to identify similar structures as described with respect to the first preferred embodiment of the present invention. The motor mount 48 associated with the embodiment shown comprises a circular member 50 as well as a plurality of radial support members 52. The circular member 50 is annular in shape and is operable to engage the annular groove 30 to the housing 14, while the radial support members 52 extend radially inward from the periphery of the circular member 50. The radial support members 52 are generally triangular in shape and are connected at their radially inward most portion to first and second annular braces 120 and 122 which are operable to receive the motor 36 therebetween. In this regard, the annular braces 120 and 122 include a plurality of slots 124 which allow bolts to be inserted therein so as to secure the annular braces to the motor. The motor mount 48 according to this embodiment is preferably made from aluminum, though other suitable materials may be used.

In this embodiment, the circular member 50 is placed within the mold which is used to form the housing 14. The molten material which is used to form the housing is able to flow around the circular member 50 thereby embedding the circular member 50 within the housing 14. The hood 32 may then be inserted over the outer surface of the circular member 50 so as to secure the hood 32 to the housing 14.

Figure 10:
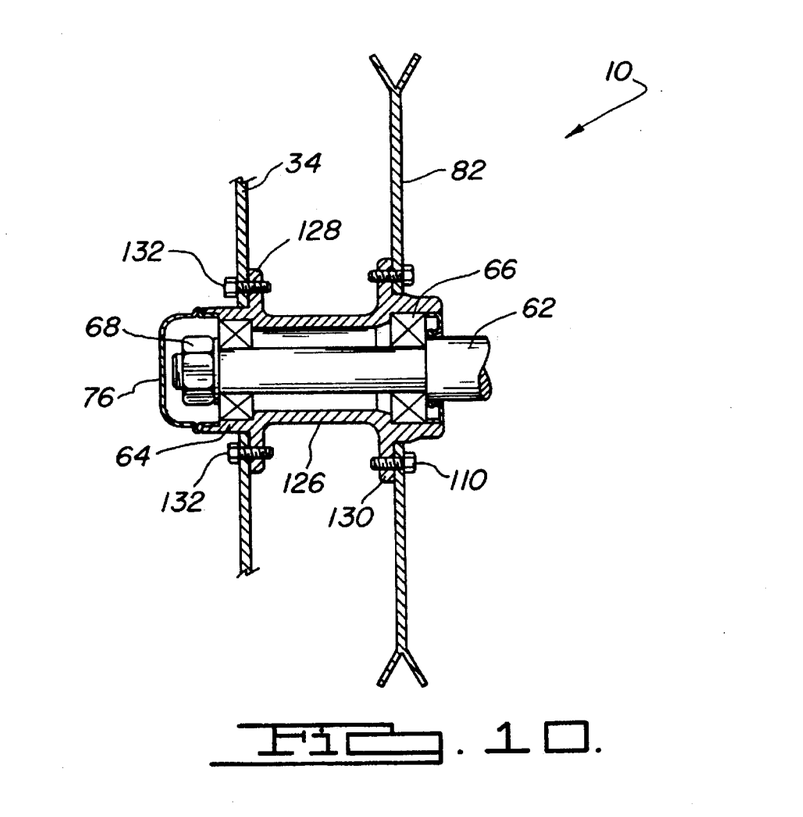
FIG. 10 is a partial cross-sectional view of a hub assembly shown in FIG. 2 according to another embodiment of the present invention.

A further preferred embodiment of the present invention is shown in FIG. 10. In this regard, like reference numerals are used to identify similar structures as described with respect to the first preferred embodiment of the present invention. The apparatus 10 according to this further embodiment of the present invention includes a hub assembly 126 which is of a unitary structure. The hub assembly 126 may be cast from a suitable material such as aluminum and then machined to provide the necessary dimensions for being secured to the fixed shaft 62. The advantage that the hub assembly 126 has with the other hub assemblies described above is due to its unitary structure. In this regard, the hub assembly 126 is able to be manufactured at a relatively low cost than other hub assemblies.

The hub assembly 126 rotates with respect to the fixed shaft 62 by means of the first and second bearings 64 and 66 in a manner similar to that described above. In addition, the hub assembly 126 includes a first annular flange 128 which is used to secure the fan 34 to the hub assembly 126. In addition, the hub assembly 126 includes a second annular flange 130 which is used to secure the second pulley 82 to the hub assembly 126. The bolts 110 are used to secure the second pulley 82 to the hub assembly 126, while the bolts 132 are used to secure the fan 34 to the hub assembly 126.

Those skilled in the art can now appreciate from the foregoing description that the broad teaching of the present invention can be implemented in a variety of forms. Therefore, while this invention has been described in connection with particular, examples thereof, the true scope of the invention should not be so limited. For example, the motor mount may be any suitable structure which engages the annular wall in more than one location. In addition, the motor mount does not necessarily have to be circular in shape, but can generally conform to any internal contour of the housing. Furthermore, the annular groove may also be of other shapes which are not necessarily circular, and therefore may be rectangular, elliptical, and so forth. In addition, the annular groove may also be discontinuous in nature, comprising, for example, radial groove segments, lineal groove segments, and so forth. The annular groove can also be replaced by other surface features which perform the same function as the annular groove such as channel members which are secured to the housing. Other modifications will become apparent to those skilled in the art.

What is claimed is:

1. An apparatus for circulating air using a fan having a plurality of blades, each of said blades including an end portion, said apparatus comprising:

a motor for rotating said blades;

a housing for said fan having a generally annular wall disposed proximate to said end portions of said blades in a space relationship thereto, said annular wall defining an opening for circulating air through said housing; and means for mounting said motor to said housing, said means for mounting said motor extending generally between said annular wall and said fan and being operable to provide support to said annular wall at substantially all locations on said annular wall so as to substantially maintain said spaced relationship between said annular wall and said blades.

2. The apparatus for circulating air as set forth in claim 1, wherein said annular wall of said housing is operable to form a flow path for said air.

3. The apparatus for circulating air as set forth in claim 1, wherein said means for mounting said motor includes a first member being operable to engage said annular wall of said housing at a plurality of locations.

4. The apparatus for circulating air as set forth in claim 3, wherein the shape of said first member is substantially defined by said cross-section of said annular wall of said housing.

5. The apparatus for circulating air as set forth in claim 3, wherein said annular wall includes a surface feature being operable to receive said first member to thereby support said motor with respect to said housing.

6. The apparatus for circulating air as set forth in claim 5, wherein mechanical interaction between said first member and said surface feature is operable to support said motor with respect to said housing.

7. The apparatus for circulating air as set forth in claim 5, wherein mechanical interaction between said first member and said surface feature is operable to centrally locate said fan with respect to said annular wall of said housing.

8. The apparatus for circulating air as set forth in claim 5, wherein said surface feature extends substantially the length of said annular wall of said housing.

9. The apparatus for circulating air as set forth in claim 8, wherein said first member is operable to be disposed within substantially the entire length of said of said surface feature.

10. The apparatus for circulating air as set forth in claim 3, wherein said means for mounting said motor includes a plurality of second members extending between said first member and a region proximate to said motor, said plurality of second members being operable to provide support to said motor with respect to said housing.

11. The apparatus for circulating air as set forth in claim 1, wherein each of said blades have an end portion, said means for mounting said motor being operable to maintain the distance between said end portions of said blades and said annular wall of said housing to less than about 0.375 inches.

12. An apparatus for circulating air using a fan having a plurality of blades, each of said blades including an end portion, said apparatus comprising:

a motor for rotating said blades;

a housing having a substantially circular portion for receiving the blades of said fan, said substantially circular portion of said housing defining an annular wall which is disposed in a spaced relationship with respect to said end portion of said blades of said fan and establishes an opening for circulating air;

a substantially circular member engaging the interior of said annular wall of said housing and being operable to substantially maintain said spaced relationship between said annular wall and said blades of said fan; and a plurality of support members extending from said substantially circular member to a region proximate said motor, said plurality of support members being operable to provide support to said motor with respect to said housing.

13. The apparatus for circulating air as set forth in claim 12, wherein said annular wall is substantially circular in shape and is operable to engage said substantially circular member at a plurality of locations.

14. The apparatus for circulating air as set forth in claim 12, wherein said annular wall includes a surface feature operable to engage said substantially circular member at a plurality of locations.

15. The apparatus for circulating air as set forth in claim 14, wherein said surface feature comprises an annular groove being operable to receive said substantially circular member.

16. The apparatus for circulating air as set forth in claim 12, wherein said plurality of support members include a plurality of radially extending members which extend radially from said substantially circular member to a region position proximate said motor.

17. The apparatus for circulating air as set forth in claim 16, further comprising a substantially circular member which mechanically communicates with said plurality of radially extending members, said substantially circular member being operable to maintain said radially extending members in a substantially planar relationship.

18. The apparatus for circulating air as set forth in claim 12, wherein said plurality of support members include a first support member spanning said substantially circular member in a first direction and a second support member spanning said substantially circular member in a second direction different from said first direction.

19. The apparatus for circulating air as set forth in claim 18, further comprising a plate which is operable to support said motor, said plate being secured to said first and second support members at a position generally central with respect to said substantially circular member.

20. The apparatus for circulating air as set forth in claim 12, wherein said substantially circular member is annular in cross-section.

21. The apparatus for circulating air as set forth in claim 20, further comprising a bracket for receiving said motor, said plurality of support members extending radially from said substantially circular member to said bracket.

22. The apparatus for circulating air as set forth in claim 12, further comprising:

a shaft for supporting said fan with respect to said housing; and means for rotationally isolating said shaft from said fan.

23. The apparatus for circulating air as set forth in claim 22, wherein said fan has a hub assembly, said means for rotationally isolating said shaft from said fan includes a plurality of bearings disposed between said hub assembly and said shaft.

24. The apparatus for circulating air as set forth in claim 23, further comprising a plate member mechanically communicating with said plurality of support members and said shaft.

25. The apparatus for circulating air as set forth in claim 24, wherein said motor mechanically communicates with said fan through a pulley, said pulley being rotationally secured to said hub assembly.

26. The apparatus for circulating air as set forth in claim 25, wherein said pulley is formed from sheet metal.

27. The apparatus for maintaining air as set forth in claim 23, where said hub assembly is unitary in construction.

28. A method for assembling an apparatus used for circulating air, said apparatus including a fan having a plurality of blades which are operable to be rotated by a motor, said method comprising the steps of:

forming a housing having an internal contour adjacent to the blades which define a surface feature;

forming a motor mount which is operable to be fixedly secured to said housing by engagement with said surface feature of said housing;

securing said motor to said motor mount; and disposing a portion of said motor mount within said surface feature to thereby fixedly secure said motor mount to said housing so that the fan is supported by the surface feature of the housing.

29. The method for assembling an apparatus for circulating air as set forth in claim 28, wherein each of said blades has an end portion, said method further comprising the additional steps of:

forming a wall in said housing which is proximate to said end portions of said blades;

securing said motor mount to said wall so as to substantially maintain a spaced relationship between said wall and said end portions of said blades during operation of said fan.

30. The method for assembling an apparatus for circulating air as set forth in claim 28, further comprising the additional steps of:

forming an annular groove in said housing;

securing said motor mount to said annular groove so as to support said motor and said plurality of blades within said housing.

31. The method for assembling an apparatus for circulating air as set forth in claim 30, wherein said step forming a motor mount includes the steps of:

forming a substantially circular member operable to be secured to said annular groove in said housing;

forming a plurality of support members which are operable to mechanically communicate with said motor; and securing said plurality of support members to said substantially circular members.

32. The method for assembling an apparatus for circulating air as set forth in claim 31, wherein said step of securing said plurality of support members to said substantially circular member includes the step of:

securing said plurality of support members to said substantially circular member in a spaced radial relationship to each other.

33. The method for assembling an apparatus for circulating air as set forth in claim 31, wherein said step of securing said plurality of support members to said substantially circular member includes the steps of:

securing a first support member to said substantially circular member so as to span said substantially circular member in a first direction; and securing a second support member to said substantially circular member so as to span said substantially circular member in a second direction different from said first direction.

34. The method for assembling an apparatus for circulating air as set forth in claim 31, wherein said step of forming a plurality of support members includes the step of:

forming a plurality of generally triangularly shaped members which are operable to be secured to said substantially circular member.

35. The method for assembling an apparatus for circulating air as set forth in claim 33, wherein said step of forming a plurality of support members includes the steps of:

forming a bracket which is operable to receive said motor; and securing said bracket to at least one of said generally triangular support members.

36. The method for assembling an apparatus for circulating air as set forth in claim 28, wherein said apparatus includes a hub assembly for supporting said plurality of blades and a shaft for supporting said hub assembly, said method comprising the additional steps of:

fixedly securing said shaft to said motor mount; and disposing a plurality of bearings between said hub assembly and said shaft so as to allow said hub assembly to rotate with respect to said shaft.

37. An apparatus for circulating air using a fan having a plurality of integrally formed blades, said apparatus comprising:

a motor for rotating said plurality of blades;

a housing for said fan having a wall disposed proximate to said plurality of blades in a spaced relationship thereto;

a shaft being fixedly secured with respect to said housing; and a hub assembly for supporting said fan within said housing, said hub assembly being supported by said shaft and being operable to rotate with respect to said shaft, whereby said hub assembly is operable to support fans of different sizes.

38. The apparatus for circulating air as set forth in claim 37, further comprising a pulley which is operable to rotate with said hub assembly in response to operation of said motor, said pulley mechanically communicating with said hub assembly and being rotationally independent from said shaft.

39. The apparatus for circulating air as set forth in claim 38, further comprising a plurality of bearings disposed between said hub assembly and said shaft, said plurality of bearings operable to allow said hub assembly to rotate with respect to said shaft.

40. The apparatus for circulating air as set forth in claim 37, further comprising a motor mount for securing said motor to said housing, said shaft being fixedly secured to said motor mount.

41. The apparatus for circulating air as set forth in claim 40, wherein said motor mount includes:

a substantially circular member engaging said wall of said housing and being operable to substantially maintain said spaced relationship between said wall and said plurality of blades; and a plurality of support members extending from said substantially circular member to a region proximate said motor, said plurality of support members being operable to provide support to said motor with respect to said housing.

42. The apparatus as set forth in claim 41, wherein said wall is substantially circular in shape and is operable to engage said substantially circular member at a plurality of locations.

43. The apparatus as set forth in claim 42, wherein said wall of said housing includes a surface feature being operable to receive said substantially circular member.

44. The apparatus as set forth in claim 41, wherein said plurality of support members include a plurality of radially extending members which extend radially from said substantially circular member to a region position proximate said motor.

45. The apparatus as set forth in claim 41, wherein said plurality of support members include a first support member spanning said substantially circular member in a first direction and a second support member spanning said substantially circular member in a second direction different from said first direction.

46. A method for assembling an apparatus for circulating air, said apparatus including a fan having a plurality of blades disposed on a hub assembly which is operable to be driven by a motor, said method comprising the steps of:

forming a housing for said fan;

securing said motor to a region proximate to said housing;

securing a shaft at least partially within said housing, said shaft being operable to support said hub assembly;

rotatably securing said hub assembly to said shaft; and forming a mechanical linkage between said fan and said motor;

whereby said fan is able to rotate with respect to said shaft while said shaft remains stationary with respect to said housing.

47. The method for assembling an apparatus for circulating air as set forth in claim 46, wherein said step of securing said shaft at least partially within said housing includes the steps of:

forming a motor mount which is operable to support said motor with respect to said housing; and securing said shaft to said motor mount so as to support said shaft with respect to said housing.

48. The method for assembling an apparatus for circulating air as set forth in claim 47, wherein said step of forming said motor mount comprises:

forming a substantially circular member which is operable to engage said housing at a plurality of locations; and securing a plurality of support members to said substantially circular member, said plurality of support members being operable to engage said motor.

49. The method for assembling an apparatus for circulating air as set forth in claim 48, further comprising the step of disposing a plurality of bearings between said shaft and said hub assembly to allow said hub assembly to rotate with respect to said shaft.

* * * * *

UNITED STATES PATENT AND TRADEMARK OFFICE
CERTIFICATE OF CORRECTION

PATENT NO. : 5,567,200
DATED : October 22, 1996
INVENTOR(S) : Swartzendruber

It is certified that error appears in the above-identified patent and that said Letters Patent is hereby corrected as shown below:

Column 8, Line 41, delete "to" after --26--.

Column 9, Line 52, delete "," after --particular--.

Signed and Sealed this

Ninth Day of June, 1998

Attest:

BRUCE LEHMAN

Attesting Officer

Commissioner of Patents and Trademarks